(12) United States Patent
Zhu et al.

(10) Patent No.: US 12,536,805 B2
(45) Date of Patent: *Jan. 27, 2026

(54) OBSTACLE RECOGNITION METHOD, APPARATUS, AND DEVICE, MEDIUM AND WEEDING ROBOT

(71) Applicant: SUZHOU CLEVA PRECISION MACHINERY & TECHNOLOGY CO., LTD., Suzhou (CN)

(72) Inventors: Shaoming Zhu, Suzhou (CN); Xue Ren, Suzhou (CN)

(73) Assignee: Suzhou Cleva Precision Machinery & Technology Co., Ltd., Suzhou (CN)

( * ) Notice: Subject to any disclaimer, the term of this patent is extended or adjusted under 35 U.S.C. 154(b) by 303 days.

This patent is subject to a terminal disclaimer.

(21) Appl. No.: 18/251,960

(22) PCT Filed: Nov. 30, 2020

(86) PCT No.: PCT/CN2020/132572
§ 371 (c)(1),
(2) Date: May 5, 2023

(87) PCT Pub. No.: WO2022/095171
PCT Pub. Date: May 12, 2022

(65) Prior Publication Data
US 2024/0013548 A1 Jan. 11, 2024

(30) Foreign Application Priority Data
Nov. 9, 2020 (CN) .......................... 202011241002.1

(51) Int. Cl.
*G06V 20/58* (2022.01)
*G05D 1/00* (2006.01)
(Continued)

(52) U.S. Cl.
CPC ........... *G06V 20/56* (2022.01); *G05D 1/0238* (2013.01); *G05D 1/0246* (2013.01); *G06V 10/56* (2022.01); *G06V 20/188* (2022.01)

(58) Field of Classification Search
CPC ...... G06V 20/56; G06V 10/56; G06V 20/188; G06V 10/25; G06V 10/267; G06V 20/58;
(Continued)

(56) References Cited

U.S. PATENT DOCUMENTS

| | | | |
|---|---|---|---|
| 2011/0135147 A1* | 6/2011 | Eswara | ..................... G06T 7/11 382/199 |
| 2016/0259981 A1 | 9/2016 | Wang et al. | |
| 2018/0084708 A1* | 3/2018 | Neitemeier | .......... A01B 69/001 |

FOREIGN PATENT DOCUMENTS

| CN | 104111460 A | 10/2014 |
|---|---|---|
| CN | 104111653 A | 10/2014 |
| CN | 105701844 A | 6/2016 |

OTHER PUBLICATIONS

International Search Report for Application No. PCT/CN2020/132572, dated Jul. 30, 2021.

* cited by examiner

*Primary Examiner* — Amandeep Saini
*Assistant Examiner* — Denise G Alfonso
(74) *Attorney, Agent, or Firm* — JK Intellectual Property Law, PA

(57) ABSTRACT

An obstacle recognition method includes the steps of: determining a candidate obstacle region in a candidate weeding region image according to color information of the candidate weeding region image; obtaining contour information of the candidate obstacle region and value information of the candidate weeding region image; and determining, according to the contour information and the value information, whether there is an obstacle in the candidate weeding region (Continued)

image. A related obstacle recognition apparatus, an electronic device, a computer-readable storage medium, and a weeding robot are also disclosed.

9 Claims, 2 Drawing Sheets

(51) Int. Cl.
*G06V 10/56* (2022.01)
*G06V 20/10* (2022.01)
*G06V 20/56* (2022.01)

(58) Field of Classification Search
CPC .... G06V 10/44; G05D 1/0238; G05D 1/0246; A01B 39/18; A01B 69/001; A01M 21/00; A01D 34/008
See application file for complete search history.

OBSTACLE RECOGNITION METHOD, APPARATUS, AND DEVICE, MEDIUM AND WEEDING ROBOT

CROSS-REFERENCE TO RELATED PATENT APPLICATIONS

This application is a national stage of International Application No. PCT/CN2020/132572, filed on Nov. 30, 2020, which claims priority to CN patent application No. 202011241002.1, filed on Nov. 9, 2020. All of the aforementioned applications are hereby incorporated by reference in their entireties.

TECHNICAL FIELD

The present application relates to an image processing technology, in particular to an obstacle recognition method and apparatus, a device, a medium, and a weeding robot.

BACKGROUND

With the improvement of living standards, people are increasingly paying attention to environmental construction, so the construction of urban green gardens is receiving increasing attention. Meanwhile, efficient green maintenance, such as daily weeding, has gradually become a demand. However, manual control is required for conventional weeding machines, so weeding robots with autonomous working functions are gradually emerging.

In existing technologies, boundary wires are generally buried to calibrate boundaries of a weeding region for a weeding robot, and consequently a lot of manpower and material resources are consumed and costs are increased. In addition, due to limitations on the burying of boundary wires, for example, corners should not be less than 90 degrees, a shape of the weeding region is limited to some extent.

SUMMARY

Embodiments of the present disclosure provide an obstacle recognition method and apparatus, a device, a medium, and a weeding robot to improve recognition efficiency and accuracy of obstacles in a candidate weeding region for a weeding robot.

In a first aspect, an embodiment of the present disclosure provides an obstacle recognition method. The method includes:
determining a candidate obstacle region in a candidate weeding region image according to color information of the candidate weeding region image;
obtaining contour information of the candidate obstacle region and value information of the candidate weeding region image; and
determining, according to the contour information and the value information, whether there is an obstacle in the candidate weeding region image.

In a second aspect, an embodiment of the present disclosure further provides an obstacle recognition apparatus. The apparatus includes:
a candidate obstacle region determination module, configured to determine a candidate obstacle region in a candidate weeding region image according to color information of the candidate weeding region image;
an information obtaining module, configured to obtain contour information of the candidate obstacle region and value information of the candidate weeding region image; and
an obstacle determination module, configured to determine, according to the contour information and the value information, whether there is an obstacle in the candidate weeding region image.

In a third aspect, an embodiment of the present disclosure further provides an electronic device. The electronic device includes:
one or more processors; and
a storage apparatus, configured to store one or more programs, where
when the one or more programs are executed by the one or more processors, the one or more processors are enabled to implement the foregoing obstacle recognition method.

In a fourth aspect, an embodiment of the present disclosure further provides a computer-readable storage medium storing a computer program. When the program is executed by a processor, the foregoing obstacle recognition method is implemented.

In a fifth aspect, an embodiment of the present disclosure further provides a weeding robot, including a robot body and the foregoing electronic device.

According to the embodiments of the present disclosure, a candidate obstacle region in a candidate weeding region image is determined according to color information of the candidate weeding region image; contour information of the candidate obstacle region and value information of the candidate weeding region image are obtained; and whether there is an obstacle in the candidate weeding region image is determined according to the contour information and the value information, thereby solving problems in existing technologies that boundary wires are generally buried to calibrate boundaries of a weeding region for a weeding robot and consequently a lot of manpower and material resources are consumed and costs are increased. In addition, a problem that a shape of the weeding region is limited to some extent due to limitations on the burying of boundary wires is solved. The present disclosure improves recognition efficiency and accuracy of obstacles in the candidate weeding region for the weeding robot.

DETAILED DESCRIPTION OF THE EMBODIMENTS

The present disclosure will be further described in detail below with reference to the accompanying drawings and embodiments. It should be appreciated that the specific embodiments described here are merely used for explaining the present disclosure, rather than limiting the present disclosure. In addition, it should be noted that, for the ease of description, only the parts related to the present disclosure, not all structures, are shown in the accompanying drawings.

Embodiment 1

Figure 1:
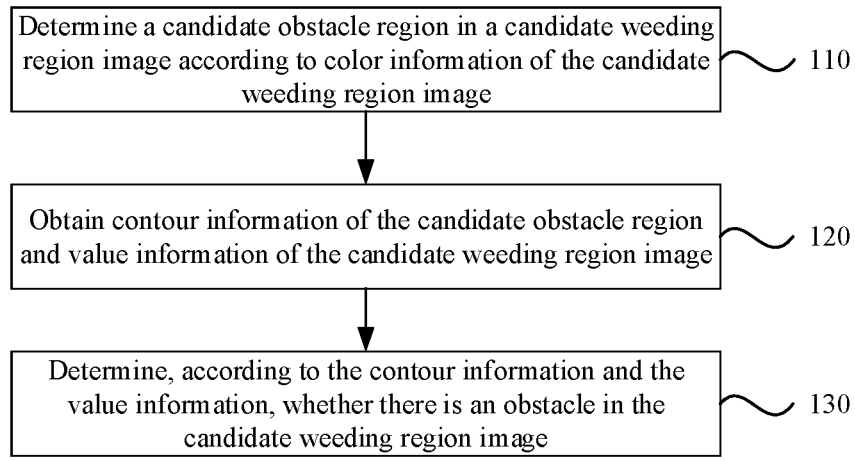
FIG. 1 is a flowchart of an obstacle recognition method provided in Embodiment 1 of the present disclosure.

FIG. 1 is a flowchart of an obstacle recognition method provided in Embodiment 1 of the present disclosure. This embodiment may be applied to a situation where a weeding robot recognizes obstacles in a candidate weeding region. The method may be performed by an obstacle recognition apparatus provided in an embodiment of the present disclosure, and the apparatus may be implemented by software and/or hardware. With reference to FIG. 1, the obstacle recognition method provided in this embodiment includes:

Step 110: Determine a candidate obstacle region in a candidate weeding region image according to color information of the candidate weeding region image.

A candidate weeding region is a region in which a weeding robot may work and in which all weeds may be about to be removed, namely, a weeding region. The candidate weeding region may alternatively be an obstacle or boundary region covered with grass on the surface, or a weeding region that is difficult to recognize due to mottling caused by lighting and other reasons.

The candidate weeding region image may be captured by a camera installed on the weeding robot, which is not limited in this embodiment. The color information of the candidate weeding region image may include information such as Hue, Saturation, and Value of the image, which is not limited in this embodiment. A probable obstacle region is determined from the candidate weeding region image through the color information. For example, the region significantly different from the surrounding in color in the image is determined as a candidate obstacle region according to the color information.

In this embodiment, optionally, the determining a candidate obstacle region in a candidate weeding region image according to color information of the candidate weeding region image includes:

obtaining a color segmentation image of the candidate weeding region image according to the color information of the candidate weeding region image; and morphologically processing the color segmentation image, and determining a region with a preset color as the candidate obstacle region from the morphologically processed color segmentation image.

With regard to obtaining a color segmentation image of the candidate weeding region image according to the color information of the candidate weeding region image, color segmentation may be performed through dynamic color segmentation, edge texture method segmentation, fixed threshold segmentation, Otsu threshold segmentation, or the like to obtain the color segmentation image of the candidate weeding region image. The color segmentation image may be a binary image. The color segmentation image is further morphologically processed, where the morphological processing may be an inverse operation, an open operation, a close operation, or the like, which is not limited in this embodiment.

The region with a preset color is determined as the candidate obstacle region from the morphologically processed color segmentation image. For example, a black region is used as a weeding region, and a white region is used as a candidate obstacle region for further recognition. The color segmentation image is obtained for preliminary classification of the candidate weeding region, and is morphologically processed to improve accuracy of determining the candidate obstacle region.

Step 120: Obtain contour information of the candidate obstacle region and value information of the candidate weeding region image.

The contour information is contour information of a single candidate obstacle region, and may be obtained through contour detection on the candidate obstacle region. The contour information may include chrominance information, roughness information, range information, and the like of a contour, which is not limited in this embodiment. The roughness information is used to display roughness of edges of the candidate obstacle region, which may be average roughness. The average roughness may be calculated by dividing a sum of roughness of all pixels in the obstacle region within the contour of the single candidate obstacle region by a total number of pixels in the obstacle region within the contour.

In this embodiment, optionally, determining the roughness information includes:

obtaining a value channel image of the candidate weeding region image;

performing edge extraction on the value channel image to obtain an edge image; and determining the roughness information according to gray values of pixels in edge information of the edge image.

Channel separation is performed on the candidate weeding region image to obtain the value channel image of the candidate weeding region image. Optionally, the value channel image is pre-processed, including filtration, normalization, and the like, which is not limited in this embodiment. Edge extraction is performed on the pre-processed value channel image to obtain the edge image. A canny operator may be used for the edge extraction to improve accuracy of obtaining the edge information in the edge image.

The roughness information of the candidate obstacle region is determined through the edge information in the edge image of the corresponding position of the candidate obstacle region, where the edge information includes gray values of pixels in the contour of the candidate obstacle region. When the roughness information is an average roughness, the average roughness of the edge of the candidate obstacle region may be obtained by dividing the number of pixels with a gray value of the obstacle region equal to 255 in the contour by the total number of pixels of the obstacle region in the contour.

The roughness information is determined through the gray values of the pixels in the edge information of the edge image, which improves the accuracy of obtaining the roughness information, thereby improving the accuracy of obstacle recognition.

The value information of the candidate weeding region image is overall value information of the candidate weeding region image, and a value channel image of the candidate weeding region image may be obtained to obtain information related to a value in the image. A relationship between the candidate obstacle region and lighting is determined through the value information.

In this embodiment, optionally, the value information of the candidate weeding region image includes: the number of exposed pixels and the number of non-exposed white pixels; and correspondingly, the obtaining the value information of the candidate weeding region image includes:

obtaining the number of exposed pixels according to values of pixels in the candidate weeding region image; and obtaining the number of non-exposed white pixels according to the values and chrominances of pixels in the candidate weeding region image.

The number of exposed pixels is the number of pixels in the candidate weeding region image that are in an exposed state. The number of non-exposed white pixels is the number of pixels in the candidate weeding region image that are not in the exposed state but appear white, such as pixels of white obstacles in the candidate weeding region image.

The number of exposed pixels may be obtained according to the values of pixels in the candidate weeding region image. A way of obtaining may include obtaining the value channel image of the candidate weeding region image, and collecting statistics on the number of pixels with values greater than or equal to a preset threshold, such as 255, as the number of exposed pixels.

The number of non-exposed white pixels is obtained according to the values and chrominances of pixels in the candidate weeding region image. Away of obtaining may include obtaining the value channel image and chrominance channel image of the candidate weeding region image, and collecting statistics on the number of pixels with values less than the preset threshold, such as 255, in the value channel image and chrominances less than or equal to a preset threshold, such as 0, in the chrominance channel image, as the number of non-exposed white pixels.

The value information is divided into the number of exposed pixels and the number of non-exposed white pixels, and the value information is determined according to the values and/or chrominances of the pixels. Consequently, accuracy of subsequently distinguishing between a mottled weeding region caused by lighting and other reasons and a white obstacle region in the candidate obstacle region is improved.

Step 130: Determine, according to the contour information and the value information, whether there is an obstacle in the candidate weeding region image.

The contour information of the candidate obstacle region and the value information of the candidate weeding region image are compared with preset information determination conditions. The preset information determination conditions are related to the contour information and the value information. If the preset information conditions are satisfied, the candidate obstacle region is determined as an obstacle region, that is, there is an obstacle in the candidate weeding region image where the obstacle region is located, so that the weeding robot performs subsequent obstacle processing.

For example, the recognized obstacle is an obstacle covered with grass on the surface of a region.

According to the technical solution provided in this embodiment, a candidate obstacle region in a candidate weeding region image is determined according to color information of the candidate weeding region image; contour information of the candidate obstacle region and value information of the candidate weeding region image are obtained; and whether there is an obstacle in the candidate weeding region image is determined according to the contour information and the value information, thereby solving problems in existing technologies that boundary wires are generally buried to calibrate boundaries of a weeding region for a weeding robot and consequently a lot of manpower and material resources are consumed and costs are increased. In addition, a problem that a shape of the weeding region is limited to some extent due to limitations on the burying of boundary wires is solved. The present disclosure improves recognition efficiency and accuracy of obstacles in the candidate weeding region for the weeding robot.

Embodiment 2

Figure 2:
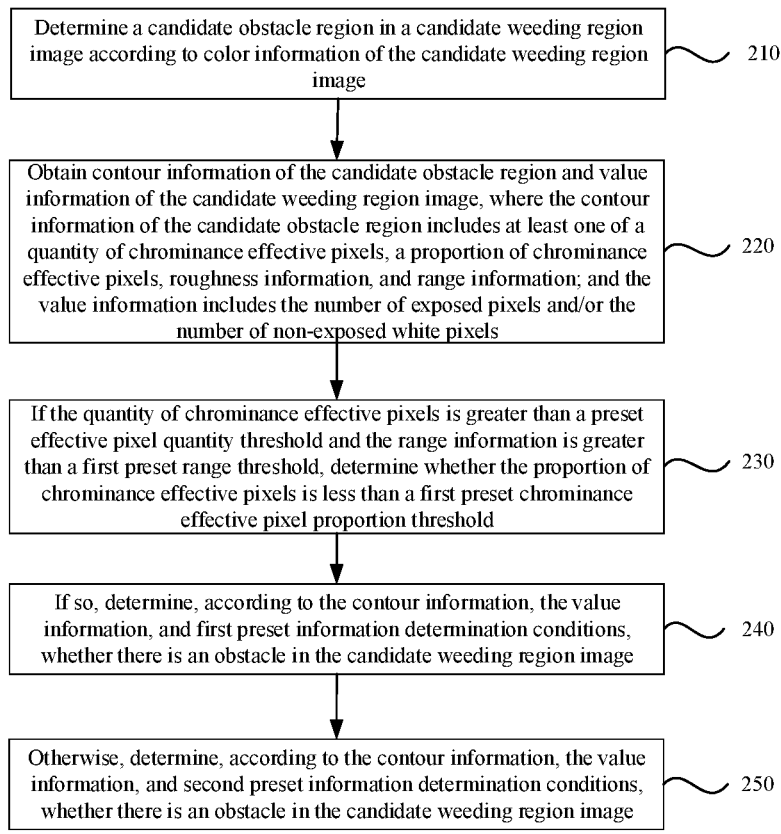
FIG. 2 is a flowchart of an obstacle recognition method provided in Embodiment 2 of the present disclosure.

FIG. 2 is a flowchart of an obstacle recognition method provided in Embodiment 2 of the present disclosure. This technical solution supplements the process of determining, according to the contour information and the value information, whether there is an obstacle in the candidate weeding region image. Compared with the foregoing solution, this solution is specifically optimized as follows: the contour information of the candidate obstacle region includes at least one of a quantity of chrominance effective pixels, a proportion of chrominance effective pixels, roughness information, and range information; the value information includes the number of exposed pixels and/or the number of non-exposed white pixels; and the determining, according to the contour information and the value information, whether there is an obstacle in the candidate weeding region image includes:

if the quantity of chrominance effective pixels is greater than a preset effective pixel quantity threshold and the range information is greater than a first preset range threshold, determining whether the proportion of chrominance effective pixels is less than a first preset chrominance effective pixel proportion threshold; and if so, determining, according to the contour information, the value information, and first preset information determination conditions, whether there is an obstacle in the candidate weeding region image;

otherwise, determining, according to the contour information, the value information, and second preset information determination conditions, whether there is an obstacle in the candidate weeding region image. Specifically, a flowchart of obstacle recognition is shown in FIG. 2:

Step 210: Determine a candidate obstacle region in a candidate weeding region image according to color information of the candidate weeding region image.

Step 220: Obtain contour information of the candidate obstacle region and value information of the candidate weeding region image, where the contour information of the candidate obstacle region includes at least one of a quantity of chrominance effective pixels, a proportion of chrominance effective pixels, roughness information, and range information; and the value information includes the number of exposed pixels and/or the number of non-exposed white pixels.

The quantity of chrominance effective pixels is the number of pixels in an effective pixel value chrominance range in an obstacle region within the contour of the single candidate obstacle region. The proportion of chrominance effective pixels is a proportion of pixels in the effective pixel value chrominance range in the obstacle region within the contour of the single candidate obstacle region to all pixels in the obstacle region within the contour. The range information is used to represent a size of the candidate obstacle region, which may be area, diagonal length, width, height, number of pixels, or the like. This is not limited in the embodiment.

In this embodiment, optionally, obtaining the quantity of chrominance effective pixels and/or the proportion of chrominance effective pixels includes:

determining a chrominance segmentation threshold interval of the candidate weeding region image according to the color information of the candidate weeding region image; and obtaining the quantity of chrominance effective pixels and/or the proportion of chrominance effective pixels according to the chrominance segmentation threshold interval and the chrominances of pixels in the candidate obstacle region.

With regard to obtaining a color segmentation image of the candidate weeding region image according to the color information of the candidate weeding region image, color segmentation may be performed through dynamic color segmentation, edge texture method segmentation, fixed threshold segmentation, Otsu threshold segmentation, or the like to obtain the chrominance segmentation threshold interval of the candidate weeding region image, so as to convert the candidate weeding region image into the color segmentation image according to the chrominance segmentation threshold interval.

The chrominance segmentation threshold interval is used as the effective pixel value chrominance range, and pixels with chrominances within the chrominance segmentation threshold interval are used as the chrominance effective pixels. The number of chrominance effective pixels in the obstacle region within the contour of the single candidate obstacle region is used as the number of chrominance effective pixels, and the proportion of chrominance effective pixels in the obstacle region within the contour of the single candidate obstacle region to all pixels in the obstacle region within the contour is used as the proportion of chrominance effective pixels.

The quantity of chrominance effective pixels and/or the proportion of chrominance effective pixels are determined through the chrominance segmentation threshold interval determined according to the candidate obstacle region, which improves correlation of the quantity of effective pixels and/or the proportion of chrominance effective pixels with the candidate weeding region image, thereby improving accuracy of subsequent recognition on obstacles in the candidate weeding region.

Step 230: If the quantity of chrominance effective pixels is greater than a preset effective pixel quantity threshold and the range information is greater than a first preset range threshold, determine whether the proportion of chrominance effective pixels is less than a first preset chrominance effective pixel proportion threshold.

The first preset effective pixel quantity threshold may be an empirical value, which is not limited in this embodiment. When the quantity of chrominance effective pixels is greater than the preset effective pixel quantity threshold, it indicates an increased probability that the candidate obstacle region is of the weeding region image, whether the candidate obstacle region is a weeding region or an obstacle region with similar color to the weeding region needs to be further determined, and the range information should be greater than the first preset range threshold to avoid processing too small candidate obstacle regions.

When the above conditions are satisfied, whether the proportion of chrominance effective pixels is less than a preset chrominance effective pixel proportion threshold is further determined, that is, a candidate obstacle region with a relatively high probability of obstacles is determined from the candidate obstacle regions with a high probability of weeding regions.

Optionally, the contour information further includes: position information. The position information is used to display the distance between the candidate obstacle region and the weeding robot, for example, a y-axis coordinate value at a bottom right corner of a minimum bounding rectangle of the candidate obstacle region, or another representative coordinate value, which is not limited in this embodiment. On the basis of determining the candidate obstacle region through the quantity of chrominance effective pixels and the range information, further determination is made through the position information to avoid processing too far candidate obstacle regions, thereby reducing processed data and improving efficiency of obstacle recognition.

For example, if the quantity of chrominance effective pixels is greater than the preset effective pixel quantity threshold, the range information is greater than the first preset range threshold, and the position information is greater than a preset position threshold, whether the proportion of chrominance effective pixels is within a range of the preset chrominance effective pixel proportion threshold is further determined.

For example, the quantity of chrominance effective pixels is $SContours_i$, wherein i is a number of the candidate obstacle region; the proportion of chrominance effective pixels is $SPContours_i$; the range information is a diagonal length $AContours_i.diagonal$ of the candidate obstacle region or a height $AContours_i.height$ of the candidate obstacle region; the position information is a y-axis coordinate value $YContours_i$ at a bottom right corner of a minimum bounding rectangle of the candidate obstacle region; and the larger coordinate value indicates that the candidate obstacle region is closer to the robot. If the preset chrominance threshold is a, the preset chrominance effective pixel proportion threshold is 0.4, the diagonal threshold of the first preset range threshold is 105, the height threshold is 70, and the preset position threshold is 75, the determination conditions are: $SContours_i>a$, $AContours_i.diagonal>105$, and $YContours_i>75$; or $SContours_i>a$, $AContours_i.height>70$, and $YContours_i>75$. Whether $SPContours_i<0.4$ is then determined.

Step 240: If so, determine, according to the contour information, the value information, and first preset information determination conditions, whether there is an obstacle in the candidate weeding region image.

When the quantity of chrominance effective pixels is greater than the preset effective pixel quantity threshold, the range information is greater than the first preset range threshold, and the proportion of chrominance effective pixels is less than the first preset chrominance effective pixel proportion threshold, whether there is an obstacle in the candidate weeding region image is determined according to the contour information, the value information, and the first preset information determination conditions. That is, further analysis is performed on the candidate obstacle region at a higher probability of obstacles determined from the candidate obstacle regions at a higher probability of weeding regions. The first preset information determination conditions may be adjusted according to specific determination scenarios, which is not limited in this embodiment.

In this embodiment, optionally, the determining, according to the contour information, the value information, and first preset information determination conditions, whether there is an obstacle in the candidate weeding region image includes:

determining that there is an obstacle in the candidate weeding region image if the number of exposed pixels is less than a first preset exposed pixel number threshold and greater than a second preset exposed pixel number threshold, and the roughness information is less than a first preset roughness threshold;

determining that there is an obstacle in the candidate weeding region image if the number of exposed pixels is greater than a third preset exposed pixel number threshold, the proportion of chrominance effective pixels is less than a second preset chrominance effective pixel proportion threshold, and the range information is greater than a second preset range threshold; or determining that there is an obstacle in the candidate weeding region image if the number of exposed pixels is greater than a fourth preset exposed pixel number threshold, the number of non-exposed white pixels is greater than a first preset non-exposed white pixel threshold, the roughness information is less than a second preset roughness threshold, and the range information is greater than a third preset range threshold.

If the contour information and the value information satisfy the first preset information determination conditions, it is determined that there is an obstacle in the candidate weeding region image.

For example, the roughness information is average roughness HContours$_i$ of the contour of the candidate obstacle region, and a smaller average roughness indicates a smoother candidate obstacle region; and the range information is about the number of pixels AContours$_i$.pixels, the number of exposed pixels overbrightPix, and the number of non-exposed white pixels zeroPix in the candidate obstacle region.

For example, if the first preset exposed pixel number threshold is 200, the second preset exposed pixel number threshold is 2500, and the first preset roughness threshold is 0.25, the first preset information determination conditions are 200<overbrightPix<2500 and HContours$_i$<0.25. When the conditions are satisfied, it is determined that there is an obstacle in the candidate weeding region image, where the obstacle may be a painted rocky road covered with grass.

For example, if the third preset exposed pixel number threshold is 500, the second preset chrominance effective pixel proportion threshold is 0.29, and the second preset range threshold is 7700, the first preset information determination conditions are 500<overbrightPix, SPContours$_i$<0.29, and AContours$_i$.pixels>7700. When the conditions are satisfied, it is determined that there are obstacles in the candidate weeding region image, where the obstacles may be leaves or wood debris.

For example, if the fourth preset exposed pixel number threshold is 400, the first preset non-exposed white pixel threshold is 80, the second preset roughness threshold is 0.27, and the third preset range threshold is 6900, the first preset information determination conditions are 400<overbrightPix, zeroPix>80, HContours$_i$<0.27, and AContours$_i$.pixels>6900. When the conditions are satisfied, it is determined that there is an obstacle in the candidate weeding region image.

Step 250: Otherwise, determine, according to the contour information, the value information, and second preset information determination conditions, whether there is an obstacle in the candidate weeding region image.

When the quantity of chrominance effective pixels is greater than the preset effective pixel quantity threshold, and the proportion of chrominance effective pixels is greater than the preset chrominance effective pixel proportion threshold, whether there is an obstacle in the candidate weeding region image is determined according to the contour information, the value information, and the second preset information determination conditions. That is, further analysis is performed on the candidate obstacle region at a lower probability of obstacles determined from the candidate obstacle regions at a higher probability of weeding regions. The second preset information determination conditions may be adjusted according to specific determination scenarios, which is not limited in this embodiment.

In this embodiment, optionally, the determining, according to the contour information, the value information, and second preset information determination conditions, whether there is an obstacle in the candidate weeding region image includes:

determining that there is an obstacle in the candidate weeding region image if the number of exposed pixels is less than a fifth preset exposed pixel number threshold and greater than a sixth preset exposed pixel number threshold, the proportion of chrominance effective pixels is less than a third preset chrominance effective pixel proportion threshold, the range information is greater than a fourth preset range threshold, the roughness information is less than a third preset roughness threshold, and the number of non-exposed white pixels is greater than a second preset non-exposed white pixel threshold; or determining that there is an obstacle in the candidate weeding region image if the number of exposed pixels is less than a seventh preset exposed pixel number threshold and greater than an eighth preset exposed pixel number threshold, the proportion of chrominance effective pixels is less than a fourth preset chrominance effective pixel proportion threshold, and the roughness information is less than a fourth preset roughness threshold.

If the contour information and the value information satisfy the second preset information determination conditions, it is determined that there is an obstacle in the candidate weeding region image.

For example, the fifth preset exposed pixel number threshold is 300, the sixth preset exposed pixel number threshold is 400, the third preset chrominance effective pixel proportion threshold is 0.6, the fourth preset range threshold is 8000, the third preset roughness threshold is 0.26, the second preset non-exposed white pixel threshold is 100, and the second preset information determination conditions are 300<overbrightPix<400, SPContours$_i$<0.6, AContours$_i$.pixels>8000, HContours$_i$<0.26, and zeroPix>100. When the conditions are satisfied, it is determined that there is an obstacle in the candidate weeding region image, where the obstacle may be a rocky road with grass growing from gaps.

For example, the seventh preset exposed pixel number threshold is 200, the eighth preset exposed pixel number threshold is 2500, the fourth preset chrominance effective pixel proportion threshold is 0.6, the fourth preset roughness threshold is 0.23, and the second preset information determination conditions are 200<overbrightPix<2500, SPContours$_i$<0.6, and HContours$_i$<0.23. When the conditions are satisfied, it is determined that there is an obstacle in the candidate weeding region image.

In the embodiment of the present disclosure, whether there is an obstacle in the candidate weeding region image is determined according to the contour information and the value information such as a quantity of chrominance effective pixels, a proportion of chrominance effective pixels, roughness information, and range information, which improves accuracy of recognizing an obstacle or boundary region covered with grass on the surface, or a candidate obstacle region that is difficult to recognize as an obstacle region due to mottling caused by lighting and other reasons.

Embodiment 3

Figure 3:
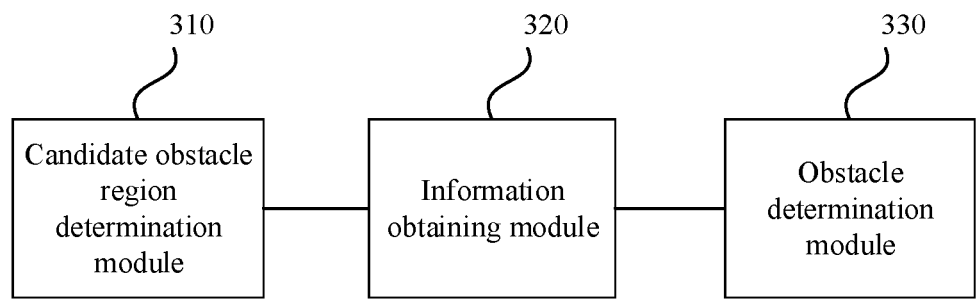
FIG. 3 is a schematic structural diagram of an obstacle recognition apparatus provided in Embodiment 3 of the present disclosure.

FIG. 3 is a schematic structural diagram of an obstacle recognition apparatus provided in Embodiment 3 of the present disclosure. The apparatus may be implemented by hardware and/or software, may perform the obstacle recognition method provided in any embodiment of the present disclosure, and has corresponding functional modules and beneficial effects for performing the method. As shown in FIG. 3, the apparatus includes:

a candidate obstacle region determination module 310, configured to determine a candidate obstacle region in a candidate weeding region image according to color information of the candidate weeding region image;

an information obtaining module 320, configured to obtain contour information of the candidate obstacle region and value information of the candidate weeding region image; and an obstacle determination module 330, configured to determine, according to the contour information and the value information, whether there is an obstacle in the candidate weeding region image.

According to the technical solution provided in this embodiment, a candidate obstacle region in a candidate weeding region image is determined according to color information of the candidate weeding region image; contour information of the candidate obstacle region and value information of the candidate weeding region image are obtained; and whether there is an obstacle in the candidate weeding region image is determined according to the contour information and the value information, thereby solving problems in existing technologies that boundary wires are generally buried to calibrate boundaries of a weeding region for a weeding robot and consequently a lot of manpower and material resources are consumed and costs are increased. In addition, a problem that a shape of the weeding region is limited to some extent due to limitations on the burying of boundary wires is solved. The present disclosure improves recognition efficiency and accuracy of obstacles in the candidate weeding region for the weeding robot.

On the basis of the foregoing technical solutions, optionally, the candidate obstacle region determination module includes:

a color segmentation image obtaining unit, configured to obtain a color segmentation image of the candidate weeding region image according to the color information of the candidate weeding region image; and a candidate obstacle region determination unit, configured to morphologically process the color segmentation image, and determine a region with a preset color as the candidate obstacle region from the morphologically processed color segmentation image.

On the basis of the foregoing technical solutions, optionally, the contour information of the candidate obstacle region includes at least one of a quantity of chrominance effective pixels, a proportion of chrominance effective pixels, roughness information, and range information; the value information includes the number of exposed pixels and/or the number of non-exposed white pixels; and correspondingly, the obstacle determination module includes:

a proportion determination unit, configured to, if the quantity of chrominance effective pixels is greater than a preset effective pixel quantity threshold and the range information is greater than a first preset range threshold, determine whether the proportion of chrominance effective pixels is less than a first preset chrominance effective pixel proportion threshold; and a first obstacle determination unit, configured to determine, according to the contour information, the value information, and first preset information determination conditions, whether there is an obstacle in the candidate weeding region image, if the proportion determination unit determines that the proportion of chrominance effective pixels is less than the first preset chrominance effective pixel proportion threshold; or a second obstacle determination unit, configured to determine, according to the contour information, the value information, and second preset information determination conditions, whether there is an obstacle in the candidate weeding region image, if the proportion determination unit determines that the proportion of chrominance effective pixels is not less than the first preset chrominance effective pixel proportion threshold.

On the basis of the foregoing technical solutions, optionally, the first obstacle determination unit includes:

a first obstacle determination subunit, configured to determine that there is an obstacle in the candidate weeding region image if the number of exposed pixels is less than a first preset exposed pixel number threshold and greater than a second preset exposed pixel number threshold, and the roughness information is less than a first preset roughness threshold;

a second obstacle determination subunit, configured to determine that there is an obstacle in the candidate weeding region image if the number of exposed pixels is greater than a third preset exposed pixel number threshold, the proportion of chrominance effective pixels is less than a second preset chrominance effective pixel proportion threshold, and the range information is greater than a second preset range threshold; or a third obstacle determination subunit, configured to determine that there is an obstacle in the candidate weeding region image if the number of exposed pixels is greater than a fourth preset exposed pixel number threshold, the number of non-exposed white pixels is greater than a first preset non-exposed white pixel threshold, the roughness information is less than a second preset roughness threshold, and the range information is greater than a third preset range threshold.

On the basis of the foregoing technical solutions, optionally, the second obstacle determination unit includes:

a fourth obstacle determination subunit, configured to determine that there is an obstacle in the candidate weeding region image if the number of exposed pixels is less than a fifth preset exposed pixel number threshold and greater than a sixth preset exposed pixel number threshold, the proportion of chrominance effective pixels is less than a third preset chrominance effective pixel proportion threshold, the range information is greater than a fourth preset range threshold, the roughness information is less than a third preset roughness threshold, and the number of non-exposed white pixels is greater than a second preset non-exposed white pixel threshold; or a fifth obstacle determination subunit, configured to determine that there is an obstacle in the candidate weeding region image if the number of exposed pixels is less than a seventh preset exposed pixel number threshold and greater than an eighth preset exposed pixel number threshold, the proportion of chrominance effective pixels is less than a fourth preset chrominance effective pixel proportion threshold, and the roughness information is less than a fourth preset roughness threshold.

Embodiment 4

Figure 4:
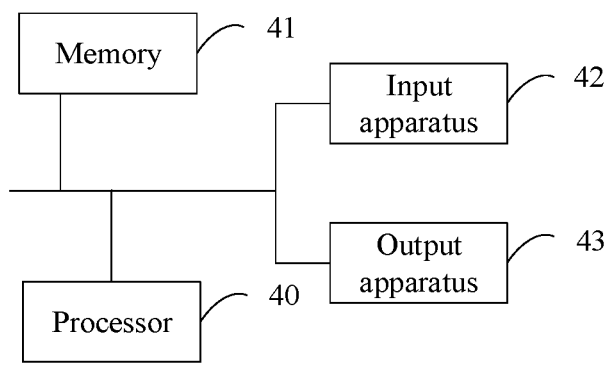
FIG. 4 is a schematic structural diagram of an electronic device provided in Embodiment 4 of the present disclosure.

FIG. 4 is a schematic structural diagram of an electronic device provided in Embodiment 4 of the present disclosure.

As shown in FIG. 4, the electronic device includes a processor 40, a memory 41, an input apparatus 42, and an output apparatus 43. One or more processors 40 may be provided in the electronic device, and one processor 40 is used as an example in FIG. 4. The processor 40, the memory 41, the input apparatus 42, and the output apparatus 43 in the electronic device may be connected through a bus or in other ways, and they are connected through a bus as an example in FIG. 4.

As a computer-readable storage medium, the memory 41 may be used to store a software program, a computer executable program, and modules, such as program instructions/modules corresponding to the obstacle recognition method in the embodiments of the present disclosure. The processor 40 executes various functional applications and data processing of the electronic device by running the software program, instructions, and modules stored in the memory 41, to implement the foregoing obstacle recognition method.

The memory 41 may mainly include a program storage region and a data storage region, where the program storage region may store an operating system, and an application program required for at least one function; and the data storage region may store data created according to use of a terminal, and the like. In addition, the memory 41 may include a high speed random access memory, and may also include a non-volatile memory, such as at least one of a magnetic disk storage device, a flash memory, or other non-volatile solid-state storage device. In some examples, the memory 41 may further include memories arranged remotely from the processor 40, and these remote memories may be connected to the electronic device through a network. Examples of the network include, but are not limited to, the Internet, an intranet, a local area network, a mobile communications network, or a combination thereof.

Embodiment 5

Embodiment 5 of the present disclosure further provides a storage medium including computer-executable instructions. The computer-executable instructions are used to execute an obstacle recognition method when being executed by a computer processor, the method including:
  determining a candidate obstacle region in a candidate weeding region image according to color information of the candidate weeding region image;
  obtaining contour information of the candidate obstacle region and value information of the candidate weeding region image; and
  determining, according to the contour information and the value information, whether there is an obstacle in the candidate weeding region image.

The computer-executable instructions included in the storage medium provided in the embodiment of the present disclosure are not limited to the foregoing method operations, but may also execute related operations in the obstacle recognition method provided in any embodiment of the present disclosure.

From the above description of the embodiments, those skilled in the art may clearly understand that the present disclosure may be implemented by means of software and necessary general-purpose hardware, and may alternatively be implemented by hardware, but in many cases the former is better. Based on such an understanding, the technical solution of the present disclosure substantially, or the part of the present disclosure making contribution to the prior art may be embodied in the form of a software product, and the computer software product may be stored in a computer-readable storage medium, such as a floppy disk of a computer, a read-only memory (ROM), a random access memory (RAM), a flash, a hard disk or a CD, including a number of instructions enabling a computer device (which may be a personal computer, a server, or a network communication device) to execute the method described in each embodiment of the present disclosure.

It is worth noting that, in the embodiment of the foregoing obstacle recognition apparatus, the included units and modules are merely divided according to functional logics, but are not limited to the foregoing division, as long as the corresponding functions can be realized. In addition, the specific names of the functional units are merely for the convenience of distinguishing from each other, and are not used to limit the protection scope of the present disclosure.

Embodiment 6

Embodiment 6 of the present disclosure provides a weeding robot, including a robot body and the electronic device as described in any embodiment of the present disclosure.

Specifically, the electronic device installed on the weeding robot may perform related operations of the obstacle recognition method described in any embodiment of the present disclosure.

The robot body may include a left active driving wheel and a right active driving wheel, which may be driven by a motor respectively. The motor may be a brushless motor with a gearbox and a Hall sensor. The robot body controls the speed and direction of the two active driving wheels to achieve forward, backward, turning, and arc driving operations. The robot body further includes a universal wheel, a camera, and a rechargeable battery, among which the universal wheel plays a supporting and balancing role. The camera is installed at a designated position of the robot at a preset angle to the horizontal direction to capture a candidate weeding region image. The rechargeable battery is used to provide power for the robot to work.

It should be noted that the foregoing descriptions are merely preferred embodiments of the present disclosure and applied technical principles. Those skilled in the art will understand that the present disclosure is not limited to the specific embodiments described herein, and various obvious changes, readjustments and substitutions can be made by those skilled in the art without departing from the protection scope of the present disclosure. Therefore, although the present disclosure is described in detail through the above embodiments, the present disclosure is not limited to the above embodiments, and may further include more other equivalent embodiments without departing from the concept of the present disclosure. The scope of the present disclosure is determined by the scope of the appended claims.

The invention claimed is:

1. An obstacle recognition method comprising the steps of:
  determining a candidate obstacle region in a candidate weeding region image according to color information of the candidate weeding region image;
  obtaining contour information of the candidate obstacle region and value information of the candidate weeding region image; and
  determining, according to the contour information and the value information, whether there is an obstacle in the candidate weeding region image;
  wherein the contour information of the candidate obstacle region comprises at least one of a quantity of chrominance effective pixels, a proportion of chrominance effective pixels, roughness information, and range information;

the value information comprises at least one of a number of exposed pixels and a number of non-exposed white pixels; and correspondingly, the step of determining, according to the contour information and the value information, whether there is an obstacle in the candidate weeding region image comprises:

if the quantity of chrominance effective pixels is greater than a preset effective pixel quantity threshold and the range information is greater than a first preset range threshold, determining whether the proportion of chrominance effective pixels is less than a first preset chrominance effective pixel proportion threshold; and if so, determining, according to the contour information, the value information, and first preset information determination conditions, whether there is an obstacle in the candidate weeding region image;

otherwise, determining, according to the contour information, the value information, and second preset information determination conditions, whether there is an obstacle in the candidate weeding region image.

2. The method according to claim 1, wherein the step of determining a candidate obstacle region in a candidate weeding region image according to color information of the candidate weeding region image comprises:

obtaining a color segmentation image of the candidate weeding region image according to the color information of the candidate weeding region image; and morphologically processing the color segmentation image, and determining a region with a preset color as the candidate obstacle region from the morphologically processed color segmentation image.

3. The method according to claim 1, wherein the step of determining, according to the contour information, the value information, and first preset information determination conditions, whether there is an obstacle in the candidate weeding region image comprises:

determining that there is an obstacle in the candidate weeding region image if the number of exposed pixels is less than a first preset exposed pixel number threshold and greater than a second preset exposed pixel number threshold, and the roughness information is less than a first preset roughness threshold;

determining that there is an obstacle in the candidate weeding region image if the number of exposed pixels is greater than a third preset exposed pixel number threshold, the proportion of chrominance effective pixels is less than a second preset chrominance effective pixel proportion threshold, and the range information is greater than a second preset range threshold; or determining that there is an obstacle in the candidate weeding region image if the number of exposed pixels is greater than a fourth preset exposed pixel number threshold, the number of non-exposed white pixels is greater than a first preset non-exposed white pixel threshold, the roughness information is less than a second preset roughness threshold, and the range information is greater than a third preset range threshold.

4. The method according to claim 1, wherein the step of determining, according to the contour information, the value information, and second preset information determination conditions, whether there is an obstacle in the candidate weeding region image comprises:

determining that there is an obstacle in the candidate weeding region image if the number of exposed pixels is less than a fifth preset exposed pixel number threshold and greater than a sixth preset exposed pixel number threshold, the proportion of chrominance effective pixels is less than a third preset chrominance effective pixel proportion threshold, the range information is greater than a fourth preset range threshold, the roughness information is less than a third preset roughness threshold, and the number of non-exposed white pixels is greater than a second preset non-exposed white pixel threshold; or determining that there is an obstacle in the candidate weeding region image if the number of exposed pixels is less than a seventh preset exposed pixel number threshold and greater than an eighth preset exposed pixel number threshold, the proportion of chrominance effective pixels is less than a fourth preset chrominance effective pixel proportion threshold, and the roughness information is less than a fourth preset roughness threshold.

5. An obstacle recognition apparatus comprising:

a candidate obstacle region determination module, an information obtaining module, and an obstacle determination module, all of which when operated together perform the method of claim 1.

6. The apparatus according to claim 5, wherein the candidate obstacle region determination module comprises:

a color segmentation image obtaining unit configured to obtain a color segmentation image of the candidate weeding region image according to the color information of the candidate weeding region image; and a candidate obstacle region determination unit configured to morphologically process the color segmentation image and to determine a region with a preset color as the candidate obstacle region from the morphologically processed color segmentation image.

7. An electronic device comprising:

one or more processors; and a storage apparatus configured to store one or more programs, wherein when the one or more programs are executed by the one or more processors, the one or more processors are enabled to implement the obstacle recognition method according to claim 1.

8. A weeding robot comprising a robot body and the electronic device according to claim 7.

9. A computer-readable storage medium storing a computer program, wherein when the computer program is executed by a processor, the obstacle recognition method according to claim 1 is implemented.

* * * * *